(12) United States Patent
Chen et al.

(10) Patent No.: US 10,914,346 B2
(45) Date of Patent: Feb. 9, 2021

(54) CLUTCH CLAW AND CLUTCH STRUCTURE USING SAME

(71) Applicant: TECO IMAGE SYSTEMS CO., LTD., Taipei (TW)

(72) Inventors: Ting-Chun Chen, Taipei (TW); Ming-Chieh Chung, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 92 days.

(21) Appl. No.: 16/225,137

(22) Filed: Dec. 19, 2018

(65) Prior Publication Data
US 2020/0173498 A1 Jun. 4, 2020

(30) Foreign Application Priority Data

Nov. 30, 2018 (TW) ................ 107143087 A

(51) Int. Cl.
*F16D 11/08* (2006.01)
*F16D 3/74* (2006.01)
*F16D 11/00* (2006.01)

(52) U.S. Cl.
CPC ............... *F16D 11/08* (2013.01); *F16D 3/74* (2013.01); *F16D 2011/008* (2013.01); *F16D 2300/12* (2013.01)

(58) Field of Classification Search
CPC .......... F16D 11/04; F16D 11/08; F16D 11/14; F16D 2011/008; F16D 3/74; F16D 2300/12; G03G 15/6529; G03G 21/186; G03G 21/1647
See application file for complete search history.

(56) References Cited

U.S. PATENT DOCUMENTS

2005/0217961 A1* 10/2005 Harrison ................ F16D 11/14
192/69
2014/0343507 A1* 11/2014 Karlsson ............. A61M 5/2466
604/198
(Continued)

FOREIGN PATENT DOCUMENTS

| CN | 106325017 B | 11/2018 |
| JP | S56-007137 U | 1/1981 |
| JP | H1047400 A | 2/1998 |

(Continued)

*Primary Examiner* — Charles A Fox
*Assistant Examiner* — Lori Wu
(74) *Attorney, Agent, or Firm* — Kirton McConkie; Evan R. Witt

(57) ABSTRACT

A clutch claw applied to a clutch structure having a rotating shaft includes a claw portion, a base portion and at least two elastic portions. The base portion is opposite to the claw portion and has a peripheral edge. The claw portion and the base portion are coaxially disposed on the rotating shaft. Each elastic portion is at least partly disposed around part of the claw portion to provide elastic force. Each elastic portion has a first end and a second end. The first end is connected with the base portion and extended from the peripheral edge, the second end is connected with the claw portion, and there is at least one bent section between the first end and the second end. Therefore, the collision damage is prevented, and the impact and friction generated when the clutch claw is instantaneously rotated is avoided, thereby achieving the advantage of reducing noise.

9 Claims, 4 Drawing Sheets

(56) References Cited

U.S. PATENT DOCUMENTS

2015/0066044 A1* 3/2015 Woods ................. A61F 2/1672
606/107
2017/0293248 A1* 10/2017 Yoshida ............. G03G 15/6529

FOREIGN PATENT DOCUMENTS

| JP | H1122769 A | 1/1999 |
| JP | 2006064793 A | 3/2006 |
| JP | 2007218403 A | 8/2007 |
| TW | M518635 U | 3/2016 |

* cited by examiner

CLUTCH CLAW AND CLUTCH STRUCTURE USING SAME

FIELD OF THE INVENTION

The present invention relates to a clutch claw, and more particularly to a clutch claw and a clutch structure using the same having an elastic characteristic.

BACKGROUND OF THE INVENTION

Nowadays, in the multifunction machine or the multifunction printer (MFP) common in the market, for facilitating the addition of paper, the structure of the paper tray is mostly designed in the form of a drawer, so the paper conveyor roller therein needs to be clutched with the transmission system. Generally, the end of the paper conveyor roller has a clutch claw that can be clutched with the transmission system. When the clutch claw and the transmission system are separated, the power cannot be transmitted to the paper conveyor roller, and when the clutch claw and the transmission system are combined, the power can be transmitted to the paper conveyor roller, so that the paper conveying action can be performed successfully.

Since the clutch claw is combined with the transmission system at a random angle, thus an impact is generated. In order to prevent the clutch claw from being damaged by the impact, in prior art, the clutch structure is designed to include a clutch claw, a spring and a metal buckle, and the spring is disposed between the metal buckle and the clutch claw, thereby absorbing the shock through the elastic force of the spring.

However, in the conventional structure design including the clutch claw and the spring, when the clutch claw is rotated, problems such as the friction between the spring and the metal buckle and the friction between the spring and the clutch claw often occur, resulting in noise generation. Furthermore, after the spring is used for a long time, its elastic force will be attenuated.

Therefore, there is a need of providing a clutch claw and a clutch structure using the same to address the above-mentioned issues.

SUMMARY OF THE INVENTION

It is an object of the present invention to provide a clutch claw and a clutch structure using the same in order to solve the drawbacks of prior art.

The present invention provides a clutch claw and a clutch structure using the same. In the clutch claw, the claw portion and the base portion are connected through the elastic portion, so that the elastic portion provides axial elastic force between the claw portion and the base portion, thereby preventing collision damage. Meanwhile, the elastic portion provides torsion elastic force between the claw portion and the base portion, thereby avoiding the impact and friction generated when the clutch claw is instantaneously rotated, and the claw portion along with the elastic portion is rotated synchronously with the rotating shaft when the rotation is performed, such that the advantage of reducing noise is achieved.

The present invention also provides a clutch claw and a clutch structure using the same. Through disposing the elastic portion having the compressible bent section, the stress can be uniformly dispersed when storing the elastic potential energy, and stress concentration is decreased, thereby avoiding elastic attenuation after long-term use.

The present invention also provides a clutch claw and a clutch structure using the same. By tightly fitting the base portion of the clutch claw with the rotating shaft, the pressure generated can resist the axial force generated when the clutch claw is compressed. Furthermore, through the elastic arm characteristic design, which is flexible, the claw portion, the base portion and the elastic portion are integrally formed, thereby reducing the number of components of the clutch structure and simplifying the assembly of the clutch structure.

In accordance with an aspect of the present invention, there is provided a clutch claw. The clutch claw is applied to a clutch structure having a rotating shaft, and the clutch claw includes a claw portion, a base portion, and at least two elastic portions. The base portion is opposite to the claw portion, and the base portion has a peripheral edge. The claw portion and the base portion are coaxially disposed on the rotating shaft. Each of the elastic portions is at least partly disposed around part of the claw portion to provide elastic force, and each of the elastic portions has a first end and a second end, which are at different ends. The first end is connected with the base portion and extended from the peripheral edge, the second end is connected with the claw portion, and there is at least one bent section, which is compressible, between the first end and the second end.

In accordance with another aspect of the present invention, there is provided a clutch structure. The clutch structure includes a roller set, a rotating shaft and a clutch claw. The rotating shaft is penetrated through the roller set, and the clutch claw includes a claw portion, a base portion, and at least two elastic portions. The base portion is opposite to the claw portion, and the base portion has a peripheral edge. The claw portion and the base portion are coaxially disposed on the rotating shaft. Each of the elastic portions is at least partly disposed around part of the claw portion to provide elastic force, and each of the elastic portions has a first end and a second end, which are at different ends. The first end is connected with the base portion and extended from the peripheral edge, the second end is connected with the claw portion, and there is at least one bent section, which is compressible, between the first end and the second end.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
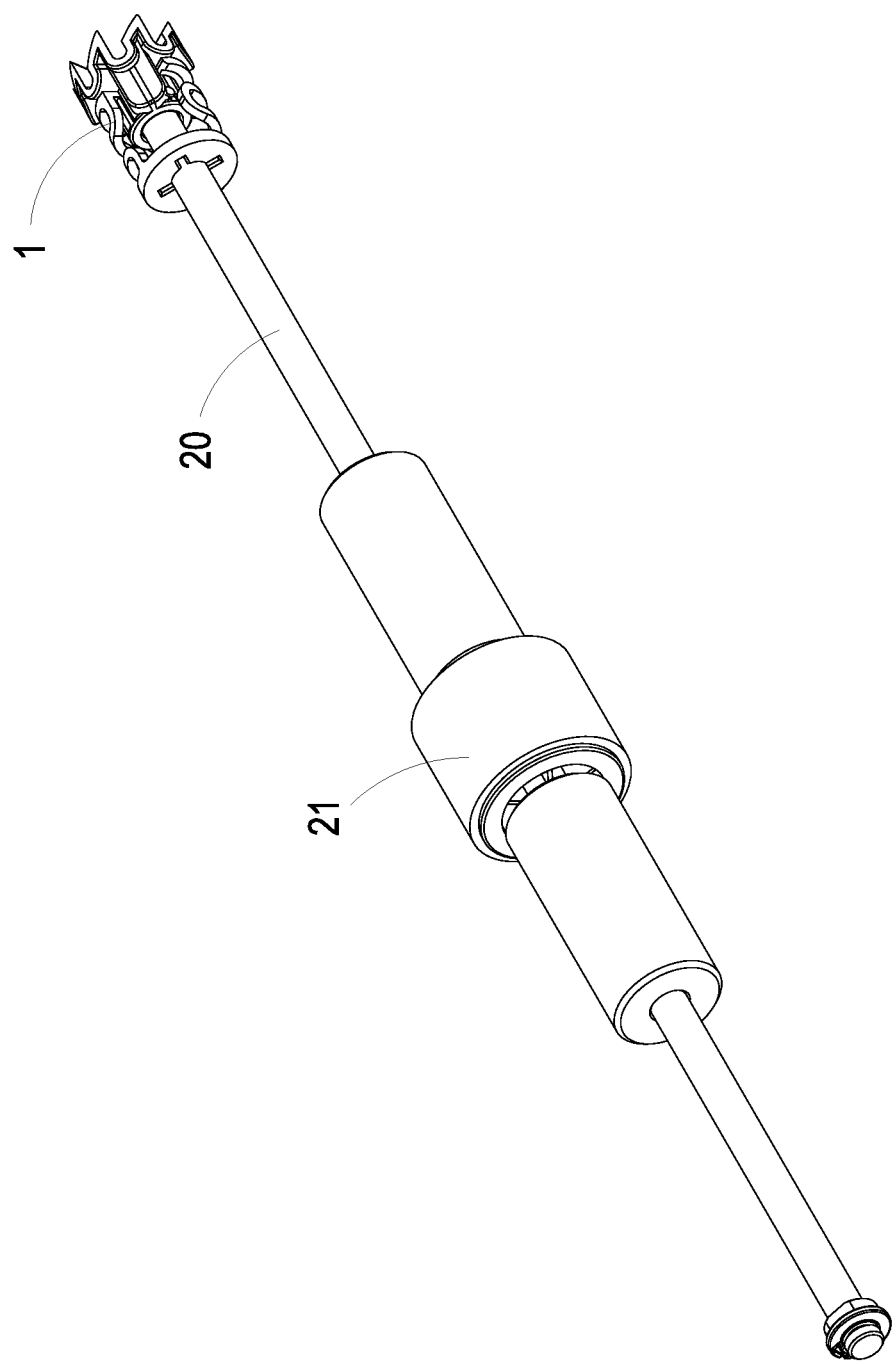
FIG. 1 schematically illustrates the structure of a clutch claw and a clutch structure using the same according to an embodiment of the present invention.
Figure 2:
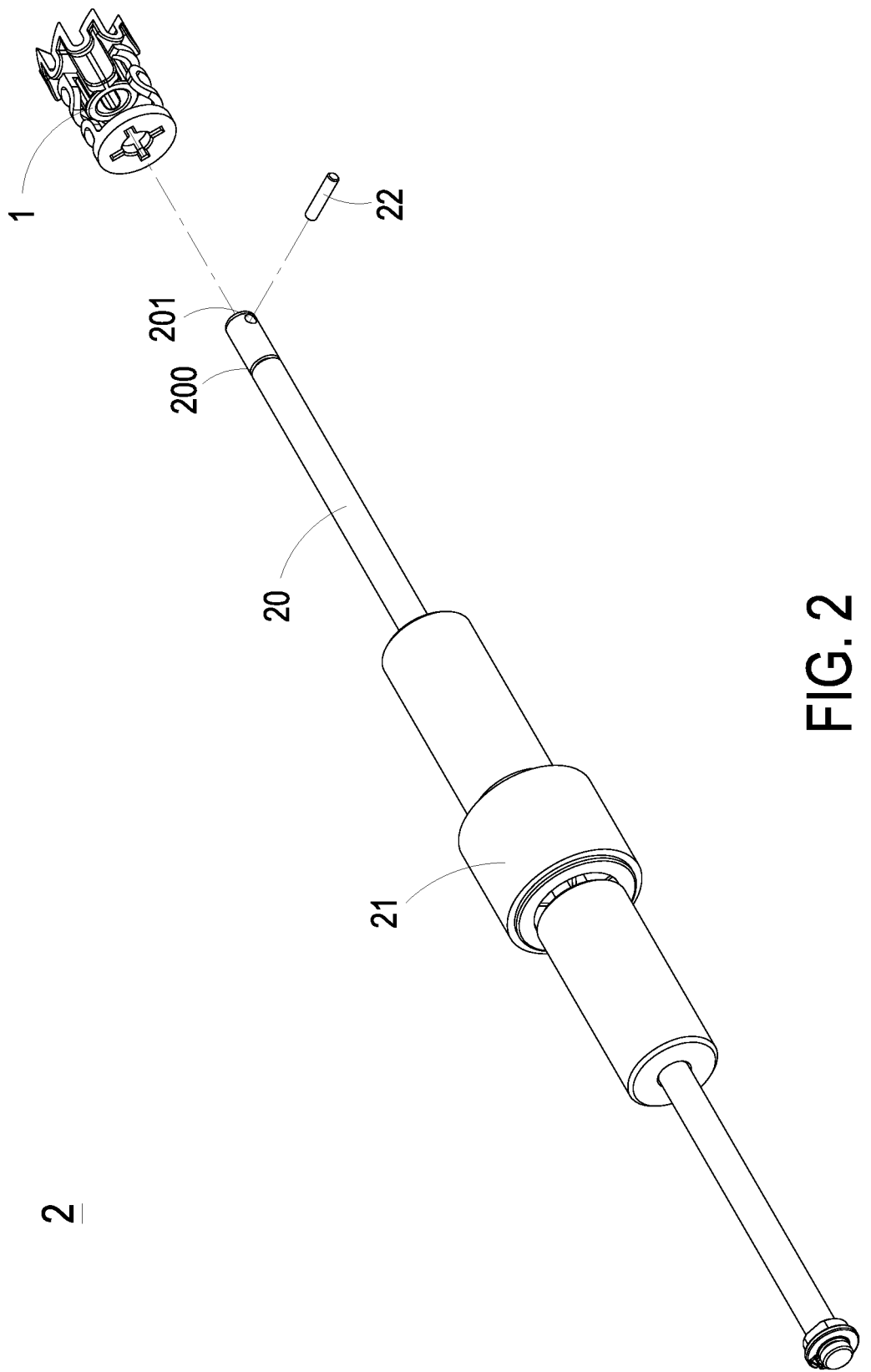
FIG. 2 schematically illustrates the exploded structure of a clutch claw and a clutch structure using the same according to an embodiment of the present invention.
Figure 3:
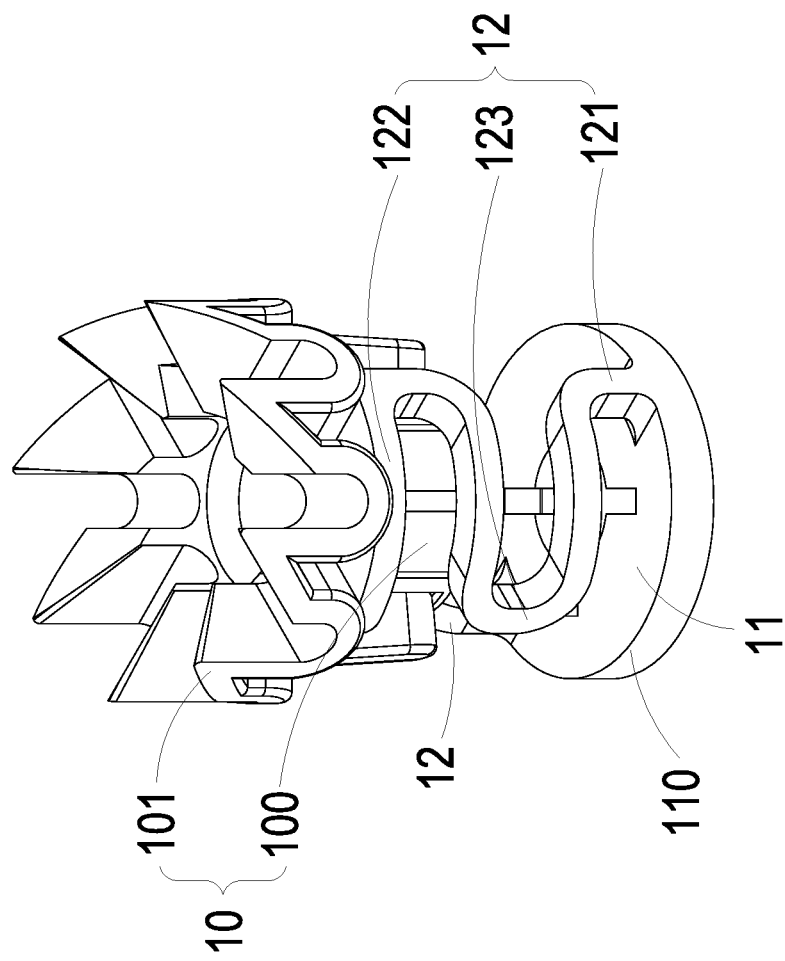
FIG. 3 schematically illustrates the structure of a clutch claw according to an embodiment of the present invention.
Figure 4:
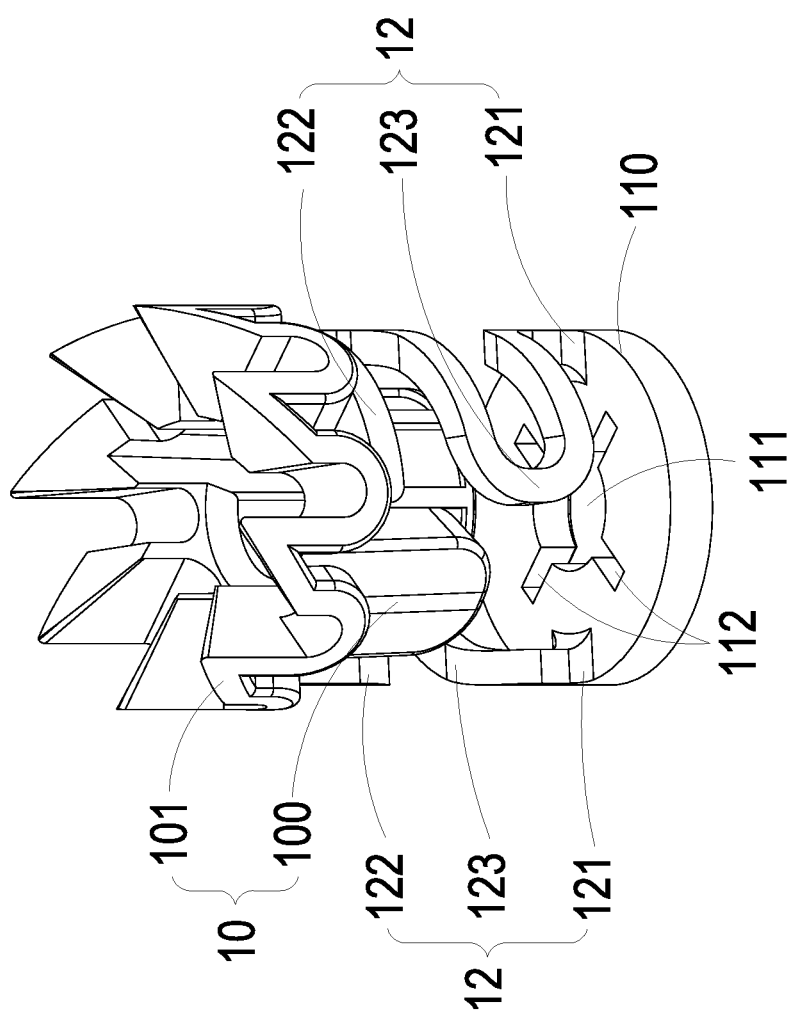
FIG. 4 schematically illustrates the structure of the clutch claw shown in FIG. 3 from another angle of view.

Please refer to FIG. 1, FIG. 2, FIG. 3 and FIG. 4. FIG. 1 schematically illustrates the structure of a clutch claw and a clutch structure using the same according to an embodiment of the present invention. FIG. 2 schematically illustrates the exploded structure of a clutch claw and a clutch structure using the same according to an embodiment of the present invention. FIG. 3 schematically illustrates the structure of a clutch claw according to an embodiment of the present invention. FIG. 4 schematically illustrates the structure of the clutch claw shown in FIG. 3 from another angle of view. As shown in FIG. 1, FIG. 2, FIG. 3 and FIG. 4, the clutch claw 1 of the present invention is applied to a clutch structure 2, which has a rotating shaft 20, and the clutch structure 2 can be, for example but not limited to, a paper conveyor roller structure for conveying paper.

The clutch claw 1 includes a claw portion 10, a base portion 11 and at least two elastic portions 12, among which the claw portion 10 can be used for matching and engaging with a transmission system, but not limited herein. The base portion 11 is opposite to the claw portion 10, and the base portion 11 has a peripheral edge 110. The claw portion 10 and the base portion 11 are coaxially disposed on the rotating shaft 20. Each of the elastic portions 12 is at least partly disposed around part of the periphery of the claw portion 10, so as to provide elastic force. In some embodiments, the claw portion 10, the base portion 11, and the elastic portions 12 are formed integrally. For example, the claw portion 10, the base portion 11 and the elastic portions 12 can be integrated in one piece through a three-dimensional structure lamination process, but not limited herein.

Each of the elastic portions 12 has a first end 121 and a second end 122, and the first end 121 and the second end 122 are at different ends of the elastic portion 12. The first end 121 is connected with the base portion 11, and the first end 121 is extended from the peripheral edge 110 of the base portion 11. The second end 122 is connected with the claw portion 10, and there is at least one bent section 123, which is compressible, between the first end 121 and the second end 122. That is to say, the first end 121 is connected with the second end 122 through the bent section 123, and the at least one bent section 123 is bent as a C-shape or an S-shape, but not limited herein. Therefore, axial elastic force and torsion elastic force between the claw portion 10 and the base portion 11 can be provided by the elastic portions 12.

For example, the first end 121 is extended from the peripheral edge 110 of the base portion 11 along the axial direction and connected to one end of the bent section 123, and the other end of the bent section is extended along the axial direction and connected to the second end 122. Furthermore, one end of the bent section 123 is curvedly connected with the first end 121, and the other end of the bent section 123 is curvedly connected with the second end 122, so as to uniformly disperse the stress and provide torque.

In other words, in the clutch claw and the clutch structure using the same of the present invention, the claw portion and the base portion are connected through the elastic portion, so that the elastic portion provides axial elastic force between the claw portion and the base portion, thereby preventing collision damage. Meanwhile, the elastic portion provides torsion elastic force between the claw portion and the base portion, thereby avoiding the impact and friction generated when the clutch claw is instantaneously rotated, and the claw portion along with the elastic portion is rotated synchronously with the rotating shaft when the rotation is performed, such that the advantage of reducing noise is achieved. Furthermore, through disposing the elastic portion having the compressible bent section, the stress can be uniformly dispersed when storing the elastic potential energy, and stress concentration is decreased, thereby avoiding elastic attenuation after long-term use.

In the present invention, one end of the rotating shaft 20 of the clutch structure 2 is penetrated through the base portion 11 and the claw portion 10 of the clutch claw 1, and the base portion 11 is tightly fit with the rotating shaft 20. In some embodiments, the base portion 11 has an opening 111 and a plurality of slits 112. The plurality of slits 112 are distributed around the periphery of the opening 111 and communicated with the opening 111, and the rotating shaft 20 is penetrated through the opening 111. The plurality of slits 112 are communicated with the opening 111, so the size of the opening 111 can be slightly enlarged, such that the opening 111 can be tightly fit with the rotating shaft 20 to generate pressure, thereby ensuring no relative rotation and translation between the base portion 11 and the rotating shaft 20.

In some embodiments, the claw portion 10 of the clutch claw 1 has a main body 100 and a claw-shaped body 101. The claw-shaped body 101 is protruded from the main body 100 for matching and engaging with the transmission system, and the rotating shaft 20 is penetrated through the main body 100. Furthermore, each of the elastic portions 12 is at least partly disposed around part of the main body 100 of the claw portion 10, and the second end 122 of each of the elastic portions 12 is abutted against the claw-shaped body 101 to provide elastic force more stably.

In some embodiments, the number of the elastic portions 12 is two, and the first ends 121 of the two elastic portions 12 are symmetric with respect to the rotating shaft 20 and extended from the peripheral edge 110 of the base portion 11, so that axial elastic force and torsion elastic force is provided stably and uniformly when relative rotational displacement is generated between the claw portion 10 and the base portion 11.

In other words, in the clutch claw and the clutch structure using the same of the present invention, by tightly fitting the base portion of the clutch claw with the rotating shaft, the pressure generated can resist the axial force generated when the clutch claw is compressed. Furthermore, through the elastic arm characteristic design, which is flexible, the claw portion, the base portion, and the elastic portion are integrally formed, thereby reducing the number of components of the clutch structure and simplifying the assembly of the clutch structure.

Please refer to FIG. 1, FIG. 2, FIG. 3 and FIG. 4. As shown in FIG. 1, FIG. 2, FIG. 3 and FIG. 4, the clutch structure 2 includes a roller set 21, a rotating shaft 20 and a clutch claw 1, among which the roller set 21 can be, for example but not limited to, a paper conveyor roller. The rotating shaft 20 is penetrated through the roller set 21, and the clutch claw 1 includes a claw portion 10, a base portion 11 and at least two elastic portions 12. The base portion 11 is opposite to the claw portion 10, and the base portion 11 has a peripheral edge 110. The claw portion 10 and the base portion 11 are coaxially disposed on one end of the rotating shaft 20. Each of the elastic portions 12 is at least partly disposed around part of the periphery of the claw portion 10, so as to provide elastic force, and the claw portion 10, the base portion 11 and the elastic portions 12 can be formed integrally, but not limited herein. The detailed structure of the elastic portions 12 has been described in detail before, and is not redundantly described herein.

In some embodiments, the clutch structure 2 further includes a bolt 22. The bolt 22 is penetrated through the rotating shaft 20 and abutted against the clutch claw 1, so as to drive the rotating shaft 20 and the roller set 21 when the clutch claw 1 is rotated. One end of the rotating shaft 20 further has a ring groove 200 and a hole 201. The base portion 11 of the clutch claw 1 is disposed around the ring groove 200, and the bolt 22 is penetrated through the hole 201 and abutted against the clutch claw 1, such that the assembly of the clutch structure 2 is more stable, but not limited herein.

From the above description, the present invention provides a clutch claw and a clutch structure using the same. In the clutch claw, the claw portion and the base portion are connected through the elastic portion, so that the elastic portion provides axial elastic force between the claw portion and the base portion, thereby preventing collision damage. Meanwhile, the elastic portion provides torsion elastic force between the claw portion and the base portion, thereby avoiding the impact and friction generated when the clutch claw is instantaneously rotated, and the claw portion along with the elastic portion is rotated synchronously with the rotating shaft when the rotation is performed, such that the advantage of reducing noise is achieved. In addition, through disposing the elastic portion having the compressible bent section, the stress can be uniformly dispersed when storing the elastic potential energy, and stress concentration is decreased, thereby avoiding elastic attenuation after long-term use. Moreover, by tightly fitting the base portion of the clutch claw with the rotating shaft, the pressure generated can resist the axial force generated when the clutch claw is compressed. Furthermore, through the elastic arm characteristic design, which is flexible, the claw portion, the base portion, and the elastic portion are integrally formed, thereby reducing the number of components of the clutch structure and simplifying the assembly of the clutch structure.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A clutch claw, which is applied to a clutch structure having a rotating shaft, comprising:
    a claw portion;
    a base portion, which is opposite to the claw portion, having a peripheral edge, wherein the claw portion and the base portion are coaxially disposed on the rotating shaft, the rotating shaft is penetrated through the base portion and the claw portion, and the base portion is tightly fit with the rotatin shaft; and
    at least two elastic portions, wherein each of the elastic portions is at least partly disposed around part of the claw portion to provide elastic force,
    wherein each of the elastic portions has a first end and a second end, which are at different ends, wherein the first end is fixedly connected with the base portion and extended from the peripheral edge, the second end is fixedly connected with the claw portion, and there is at least one bent section, which is compressible, between the first end and the second end.

2. The clutch claw according to 1, wherein the base portion has an opening and a plurality of slits, wherein the plurality of slits are distributed around the opening and communicated with the opening, and the rotating shaft is penetrated through the opening.

3. The clutch claw according to claim 1, wherein the claw portion has a main body and a claw-shaped body, wherein the claw-shaped body is protruded from the main body, and the rotating shaft is penetrated through the main body.

4. The clutch claw according to claim 3, wherein each of the elastic portions is at least partly disposed around part of the main body, and the second end of each of the elastic portions is abutted against the claw-shaped body.

5. The clutch claw according to claim 1, wherein the claw portion, the base portion, and the elastic portions are integrally formed.

6. The clutch claw according to claim 1, wherein the number of the elastic portions is two, and the first ends of the two elastic portions are symmetric with respect to the rotating shaft and extended from the peripheral edge of the base portion.

7. The clutch claw according to claim 1, wherein the at least one bent section is bent as a C-shape or an S-shape.

8. A clutch structure comprising:
    a roller set;
    a rotating shaft penetrated through the roller set; and
    a clutch claw comprising:
        a claw portion;
        a base portion, which is opposite to the claw portion, having a peripheral edge, wherein the claw portion and the base portion are coaxially disposed on the rotating shaft, the rotating shaft is penetrated through the base portion and the claw portion, and the base portion is tightly fit with the rotating shaft; and
        at least two elastic portions, wherein each of the elastic portions is at least partly disposed around part of the claw portion to provide elastic force,
        wherein each of the elastic portions has a first end and a second end, which are at different ends, wherein the first end is fixedly connected with the base portion and extended from the peripheral edge, the second end is fixedly connected with the claw portion, and there is at least one bent section, which is compressible, between the first end and the second end.

9. The clutch structure according to claim 8 further comprising a bolt penetrated through the rotating shaft and abutted against the clutch claw.

* * * * *